UNITED STATES PATENT OFFICE.

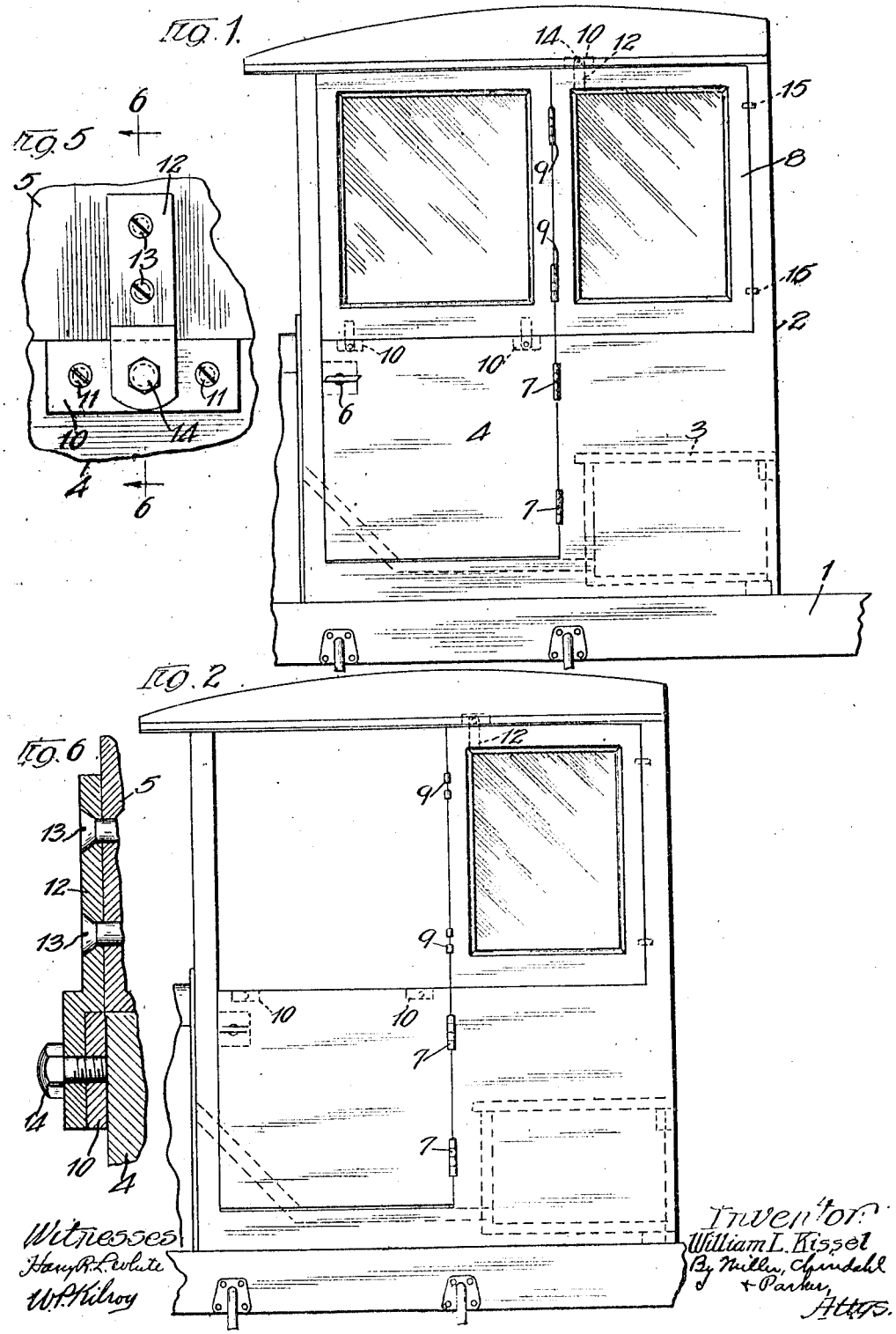

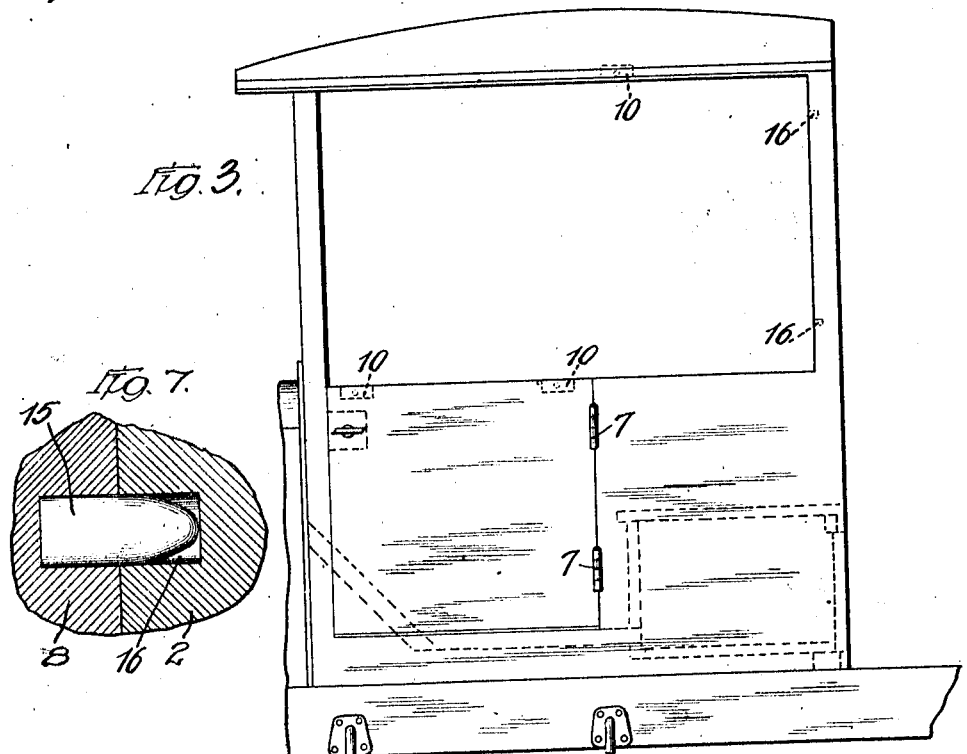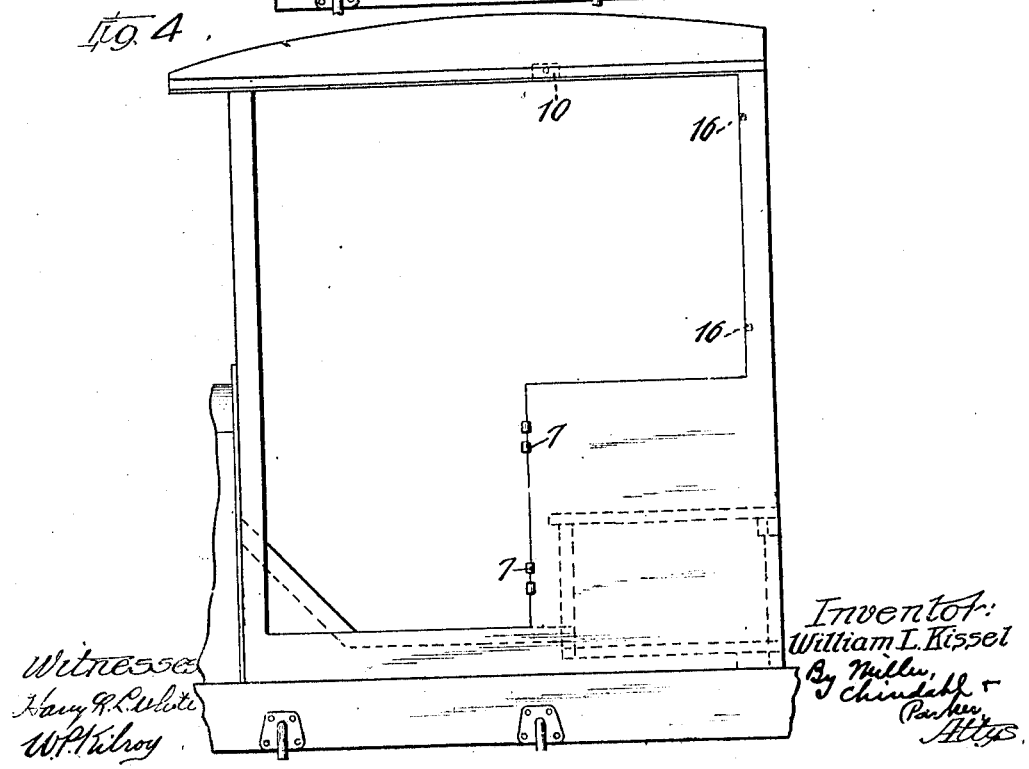

WILLIAM L. KISSEL, OF HARTFORD, WISCONSIN.

DRIVER'S CAB FOR MOTOR-TRUCKS.

1,274,421. Specification of Letters Patent. Patented Aug. 6, 1918.

Application filed March 6, 1917. Serial No. 152,529.

*To all whom it may concern:*

Be it known that I, WILLIAM L. KISSEL, a citizen of the United States, residing at Hartford, in the county of Washington and State of Wisconsin, have invented certain new and useful Improvements in Drivers' Cabs for Motor-Trucks, of which the following is a specification.

It is very desirable that the cab of a motor truck shall be capable of being completely inclosed so that the driver shall be thoroughly protected in winter and in stormy weather. In warm weather, however, it is equally desirable for the comfort of the driver that the cab shall be open.

The object of this invention is to produce a cab which may be readily converted from a completely inclosed condition to one wherein it is open to an extent which is variable at will, and to attain such convertibility by simple and convenient means.

In the accompanying drawings, Figure 1 is a side elevation of a driver's cab embodying the features of my invention, the cab being illustrated as completely inclosed. Fig. 2 is a view showing the upper section of the doors removed. Fig. 3 shows the cab as being rendered still more nearly open by the removal of the side windows. Fig. 4 represents the cab with the doors and side windows wholly removed. Fig. 5 is a fragmental detail view of one of the fastening devices. Fig. 6 is a section on line 6—6 of Fig. 5. Fig. 7 is a detail view of another of the fastening devices.

In the drawings, 1 represents a portion of the chassis of a motor truck, 2 the cab and 3 the seat within the cab. The cab is provided at each side with a door consisting of a lower section 4 and an upper glazed section 5. 6 indicates a lock carried by the lower door section 4. Said section is hinged to the side wall of the cab by means of hinges 7.

In each side of the cab is a removable wall-section 8 which is preferably in the form of a window. The upper door section 5 is connected to the window 8 by means of hinges 9 which are vertically alined with the hinges 7.

The door sections 4 and 5 may be detachably secured together in any suitable manner, as for example, by means of the devices shown in Figs. 5 and 6. 10 denotes a plate secured to the inner side of the lower door section by means of screws 11. A plate or bar 12 is secured to the inner side of the upper door section by means of screws 13, one end of said plate or bar being offset to overlap the plate 10. 14 is a screw extending through the overlapping portions of the members 10 and 12 and serving to secure said members rigidly together.

Any suitable number of devices such as that shown in Fig. 5 may be employed to connect the door-sections 4 and 5 together. Two are herein used, as indicated in Fig. 1.

The window 8 may be secured in place in any desired manner. Herein I have shown the rear edge of the window as provided with a dowel pin or projection 15 arranged to extend into a socket 16 of any suitable character in the body of the cab. Any desired number of dowel pins may be employed, two being herein shown.

The forward upper corner portion of the window 8 may be secured to the body or framework of the cab by suitable means, as, for example, that employed for connecting together the two sections of the door, a plate 10 being secured to the cab and a plate 12 being secured to the window.

With the parts arranged as shown in Fig. 1, it will be seen that the cab is completely inclosed. The door sections are rigidly secured together and are arranged to swing on the axis of the hinges 7 and 9. If it be desired to remove the upper door section, the screws 14 are removed and the pintles of the hinges 9 are withdrawn in the usual manner, thereby disconnecting the door section 5 from the door section 4 and the window 8. The cab is then in the condition illustrated in Fig. 2. If desired, the window 8 also may be removed by taking out the screw 14 that secures the upper forward portion of the window in place, the dowel pins 15 being then freely withdrawable from the sockets 16. Fig. 3 shows the cab with the upper door section and the window 8 removed. If desired, the lower door section also may be taken off by drawing out the pintles of the hinges 7. The cab will then be entirely open, as represented in Fig. 4.

It will be understood that both sides of the cab are or may be similarly constructed. The front and rear ends of the cab may be closed in any ordinary or suitable manner.

It will be noted that the plates 10 and 12 by means of which the removable sections are secured in place always remain attached to their respective sections, the screws 14 only being removed; hence there is no danger of the plates 10 and 12 being mislaid or lost, and said plates are always in position to register with each other when the sections 4, 5 and 8 are returned to place on the cab. Moreover, the fastenings are small and neat and are located inside the cab, being therefore inconspicuous.

I claim as my invention:

In a freight-hauling truck, the combination of a cab body, one side of which contains an opening of greater width at its upper portion than its lower portion, a door comprising a lower section and a separable upper section, the lower section closing the lower portion of said opening and being hinged at its rear edge to the side of the body, the upper section of the door closing a part of said wide upper portion of the opening, fastening devices for securing said door sections together comprising parts carried by the upper door section and projecting down and overlapping the abutting edge of the lower door section, a window or wall section closing the remaining rear portion of said opening, to which latter section the upper door section is hinged coaxially with the lower door section, dowel pins projecting horizontally rearward from the rear vertical edge of said window section and engaging in sockets in the cab body, and a fastening device located at the forward upper corner of said window section and comprising a part carried by said section and projecting upwardly and overlapping the abutting portion of the body for firmly securing said window section to the body while allowing said section to be removed therefrom by forward withdrawal in the plane of said dowel pins, whereby the cab may be converted at will by removing the upper door section, or the upper and lower door sections alone, or the upper section and the window section alone, or all three of said sections at the same time.

In testimony whereof I have hereunto set my hand.

WILLIAM L. KISSEL.

Copies of this patent may be obtained for five cents each, by addressing the "Commissioner of Patents, Washington, D. C."